United States Patent Office 3,000,185
Patented Sept. 19, 1961

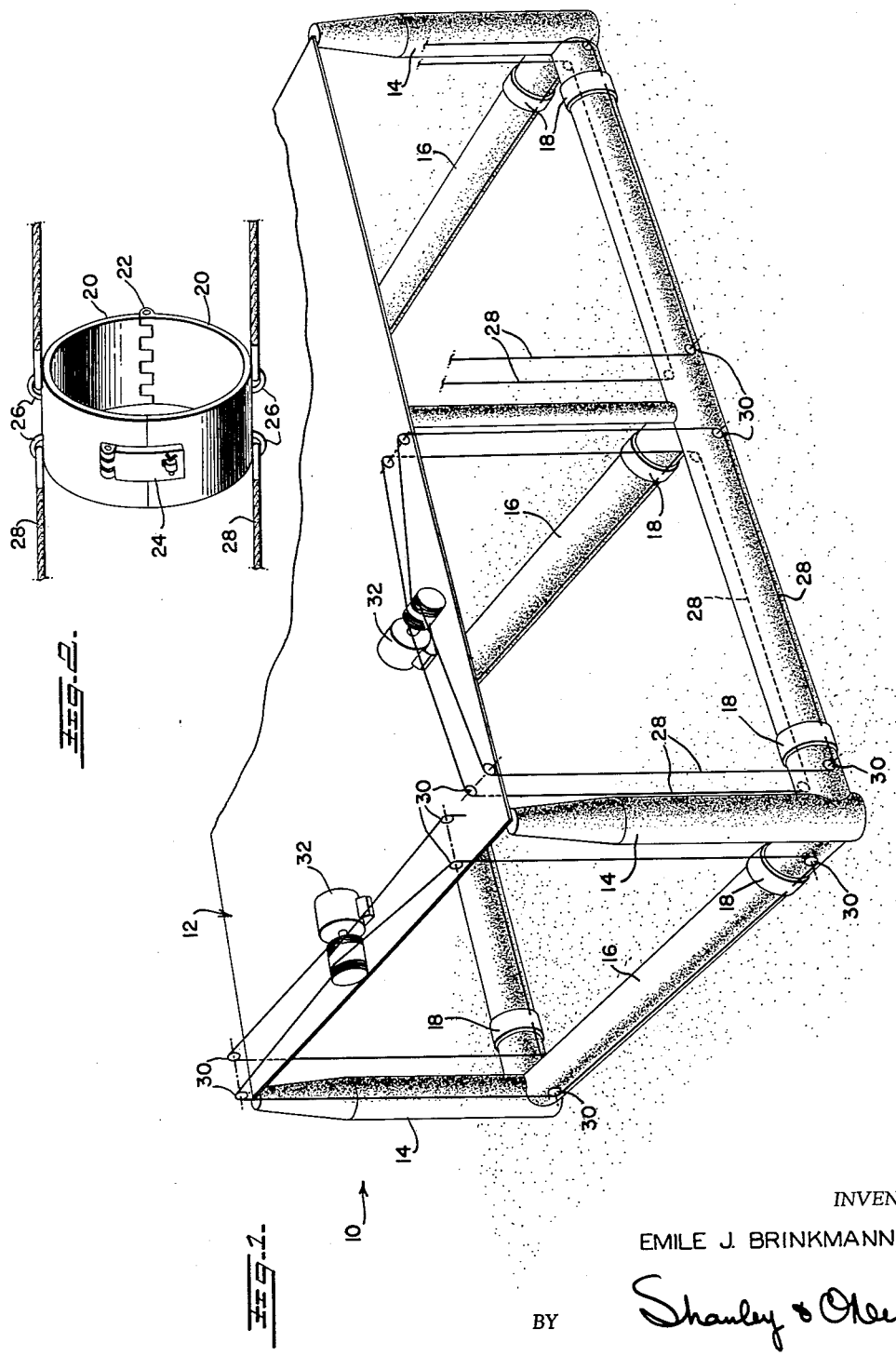

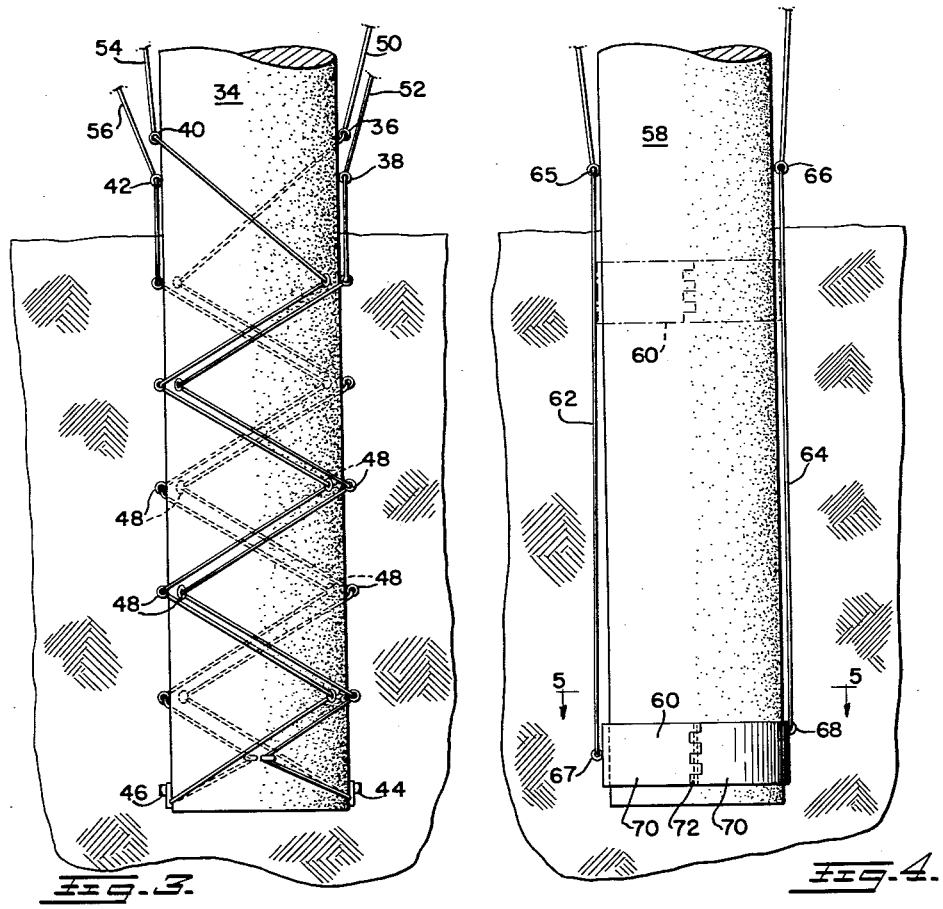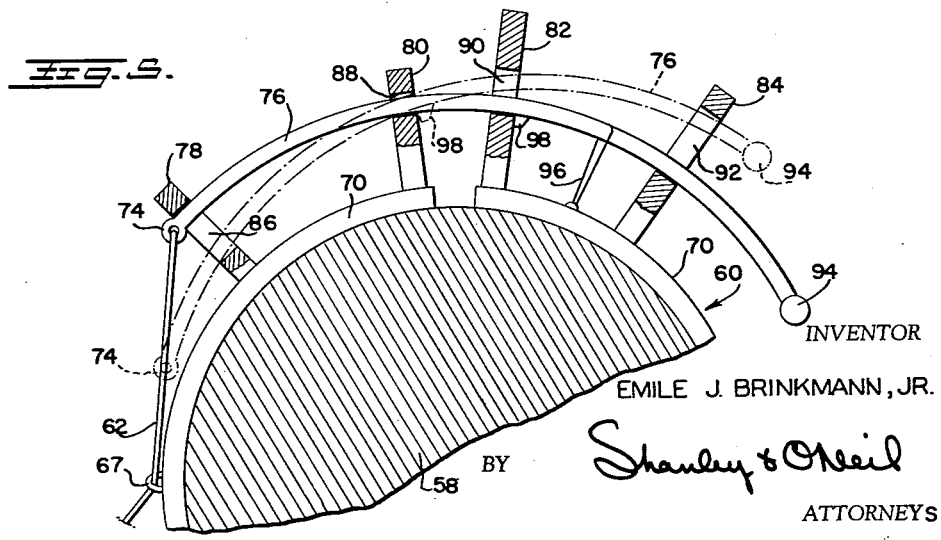

3,000,185
METHODS AND APPARATUS FOR BREAKING SUCTION BETWEEN HYDRAULIC SOIL AND OBJECTS IN CONTACT THEREWITH
Emile J. Brinkmann, Jr., New Orleans, La., assignor to Kerr-McGee Oil Industries, Inc., a corporation of Delaware
Filed Mar. 14, 1958, Ser. No. 721,542
2 Claims. (Cl. 61—46.5)

The present invention relates to methods for supporting rigid members in contact with hydraulic soil and removing them from such contact, and to rigid members for use in contact with hydraulic soil and adapted for relatively easy removal from such contact.

In the specification and claims, the term "hydraulic soil" refers to soil or mud, saturated with water, such as is found at the bottom of bodies of water.

This invention has utility in any environment in which rigid members must be removed from contact with hydraulic soil, as in the extraction of marine piling or the protective casings of off-shore wells, or the refloating of submersible barges or drilling platforms, or the like. Solely for purposes of illustration, the invention will be exemplified in connection with mobile marine platforms of the type which are especially useful in off-shore boring and drilling operations, which are supported in use on the bottom of the ocean or other body of water, and which are movable from one off-shore location to another, as well as in connection with marine piling.

The mobile marine platforms which typify an environment of the present invention have attained widespread commercial usage in recent years. Generally, these comprise deck structure which provides the platform for underwater drilling or boring operations and which is supported above the surface of the water by spuds or piles having at their lower ends structure adapted to rest on the bottom of the ocean or other body of water. This latter structure may be in the form of pads which are lowered into and raised from contact with the ocean floor by jacks, or in the form of chambers or large tubes of which the buoyancy may be regulated by the removal or introduction of water to raise or lower the platform as a whole, as in co-pending application Serial No. 617,127, filed October 19, 1956, and now abandoned. In any event, supporting structure is selectively engagebale with the ocean floor to bear a portion of the weight of the platform and to emplace the platform for work operations and disengagable from the ocean floor to permit movement of the platform to another location.

Emplacement of the supporting structure presents no particular problem, but the removal of the supporting structure from contact with the ocean floor has heretofore been a difficult and time-consuming operation. This is because the mud or other hydraulic soil under pressure of the supporting structure consolidates against the structure and holds the structure to the ocean floor by a strong adhesion known in the art as "suction." The periodic changes in pressure at the interface of the supporting structure with the hydraulic soil accelerate consolidation and the onset of suction. The force necessary to overcome the suction is in addition to the force necessary to refloat the platform and is ordinarily of considerable magnitude, and the work necessary to exert this additional force represents a considerable waste of time, labor and power.

In addition to bein inefficient, the raising of a platform which adheres to the ocean floor by suction can also be hazardous. This is because a rising or sinking platform has very little stability. When the platform is fully sunk and rests on the ocean floor it is obviously quite stable. Also, when it is fully raised and floats on its enlarged bottom portions it has much the same stability as a flat bottomed boat. But between these two extremes, when the enlarged bottom portions are between the surface and the floor of the ocean, there is little that lends stability to the barge.

Therefore, these barges must be raised and lowered slowly and cautiously. This can be done by gradually admitting water to the float chambers to sink the barge, but no such careful control has heretofore been possible when raising a barge held to the ocean floor by suction. As indicated, if the barge is made so buoyant as to overcome substantial suction, it is a good deal lighter than the water it displaces. The result has been that the barge suddenly frees itself from the ocean floor and rises rapidly through the water. There is no opportunity to control the buoyancy or to correct for tilting and the barge may list sharply with disastrous consequences.

Many attempts have heretofore been made to overcome marine suction and to facilitate the removal of marine structures from contact with hydraulic soil. For example, it has been proposed to provide pipes terminating adjacent the interface of the supporting structure with hydraulic soil, and to force fluid through the pipes under pressure, in the hope that the increase of pressure resulting from the introduction of the pressure fluid would reduce the drag of the hydraulic soil. However, in practice, the pressure fluid did not spread evenly over the interface but merely cut channels through the softest portions of the soil and escaped by the path of least resistance, thereby providing no substantial suction relief.

In another effort to relieve suction, portions of the supporting structure in contact with hydraulic soil have been hingedly mounted relative to other portions, with the thought that manipulation of the articulated structure might aid in dislodgement thereof. Actually, however, the use of articulated sections merely divided the job into a number of smaller jobs which were even more time-consuming than before. Moreover, the articulated construction was expensive to manufacture, subject to frequent malfunction when sunk in hydraulic soil, and exceedingly difficult to maintain.

Another proposal for relieving suction involves covering the soil-contacting surfaces of the supporting structure with flexible sheets and then sinking the structure into contact with the soil. Upon completion of the work operation, the supporting structure is raised independently of the sheets, and finally the sheets are retrieved. However, the heaving of the structure resulting from wave motion and the action of the tides soon misaligns the sheets relative to the structure, so that the sheets function more as mud dredges than suction relievers. In an effort to secure the sheets to the supporting structure and at the same time to relieve suction, the prior art has proposed to secure the sheets to the supporting structure in fluid-tight relationship so as to provide a fluid chamber between the sheet and the support, with the provision of means for introducing pressure fluid into the fluid chamber thus defined. Naturally, the task of establishing an inflated sheath about the irregular contours of the supporting structure is quite difficult and even when successful provides no more than a relatively rigid structure which is substantially no easier to dislodge than the structure without the sheath.

Although these and other attempts have been made or proposed to overcome the difficulties and disadvantages of the prior art, none, as far as is known, has been entirely successful when carried into practice commercially on an industrial scale.

By contrast, the present invention solves the problems of the prior art by means of very simple procedures and arrangements easily usable with existing support structures. Broadly, the invention comprises methods of removing rigid members such as supporting structure from contact with hydraulic soil such as that found on the ocean floor, by moving hydraulic soil displacing means substantially parallel and contiguous to at least a portion of an interface of the rigid member with hydraulic soil so as to break the suction and thereafter removing the rigid member from contact with the hydraulic soil, as well as methods of supporting rigid members by contact with hydraulic soil by first releasably securing the displacing means to the rigid member, then emplacing the rigid member, and finally releasing the displacing means and moving the same and removing the rigid members as described above. The invention also includes supporting members comprising rigid members in combination with displacing means movable or releasable and movable as described above. In one illustrative embodiment of the invention, the hydraulic soil displacing means comprises means encompassing the rigid member, while in another illustrative embodiment the displacing means comprises an elongated flexible member having portions thereof transverse to other portions thereof.

Accordingly, it is an object of the present invention to provide methods for supporting rigid members in contact with hydraulic soil and facilitating the removal of the members from such contact.

Another object of the invention is the provision of supporting structure comprising rigid members for use in contact with hydraulic soil and having provision for easy disengagement from such soil.

Finally, it is an object of the present invention to provide rigid members for use in contact with hydraulic soil and readily disengageable therefrom by the provision of means which will be relatively inexpensive to manufacture, easy to install, operate and maintain, and rugged and durable in use.

Other objects and advantages of the present invention will become apparent from a consideration of the following description, taken in conjunction with the accompanying drawings, in which:

FIGURE 1 is a perspective view of a mobile submersible barge of the open lattice network type and illustrating the adaptability thereto of one embodiment of the present invention;

FIGURE 2 is an enlarged perspective view of the hydraulic soil displacing means of the embodiment of FIGURE 1;

FIGURE 3 is an elevational view of the lower end of an emplaced pile and illustrating another embodiment of the present invention;

FIGURE 4 is a view similar to FIGURE 2 but showing still another embodiment of the invention; and FIGURE 5 is an enlarged fragmentary cross-sectional view taken on the line 5—5 of FIGURE 4, with parts broken away for clarity.

Referring now to the drawings in greater detail, there is shown in FIGURE 1 one embodiment of the present invention in use in the enviroment of a mobile marine platform indicated generally at 10 and comprising deck structure 12 which forms the support for work sheds, cranes and derricks and other equipment and materials useful in off-shore drilling and boring operations. Deck structure 12 is supported above the water by vertical tubular columns 14 which are secured at their lower ends to horizontal tubular chambers 16. Chamebrs 16 are hollow, and pumping means (not shown) are provided for selectively introducing water into and removing water from these hollow chambers to regulate the buoyancy of platform 10 thereby selectively to sink platform 10 into contact with the bottom of the ocean or other body of water for the performance of a work operation such as drilling or boring at a selected location and to refloat platform 10 at the end of that operation when it is desired to move platform 10 to another off-shore job site, as more fully set forth in application Serial No. 617,127, filed October 19, 1956, to which reference is made for a more detailed description of the structure and operation of platform 10. The present invention is also useful in connection with barges which are sunk and refloated by the "one-end-first" method described in United States Patent No. 2,551,375, issued May 1, 1951.

When chambers 16 rest on the ocean floor, they become at least partially embedded in mud and consolidate the hydraulic soil against which they press. To refloat platform 10 against the adhesion of the resulting suction, it would ordinarily be necessary to pump considerably more water from chambers 16 than would be the case if there were no suction to overcome. When the platform would thus be freed, it would rise rapidly and perhaps lurch dangerously, as described above.

In order to reduce suction in the embodiment of FIGURES 1 and 2, a plurality of slidable annular collars 18 is disposed in slidable encompassing relationship about chambers 16 to slide longitudinally thereon. Each collar 18 comprises a pair of semi-cylindrical halves 20 swingably joined together by a hinge 22 and adapted to be secured in cylindrical relationship to each other about a chamber 16 by means of a catch 24. Each collar 18 is provided with four ears 26 to which the ends of cables 28 are secured, the cables then being reeved about the pulleys 30 and trained onto deck structure 12 where they are wound or unwound under the influence of power driven reversible winches 32 having conventional overload clutch releases (not shown). Alternatively, cables 28 may be operated by tugs riding alongside platform 10.

Collars 18 serve as hydraulic soil displacing means which move substantially full length of chambers 16 between columns 14. The movement of collars 18 is substantially parallel and contiguous to the outer surface of chambers 16 and hence to the interface between chambers 16 and the hydraulic soil. In operation, the pair of cables on one axial side of a collar 18 is wound up by the associated winch 32 to move collar 18 and work the hydraulic soil in contact therewith so as to reduce soil suction, while the other two cables on the opposite axial side of collar 18 are payed out in the direction of movement of collar 18.

If desired, collar 18 may be moved back and forth along chamber 16 several times; but ordinarily it is necessary to make only one pass with collar 18 substantially full length of its path between columns 14.

The collars 18 remain on chambers 16 from job to job, it being necessary only to reverse the operation of winches 32 at the end of each job. Although hinge 22 and catch 24 render each collar 18 removable from its associated chamber 16, it is necessary to effect removal only for maintenance, repair or replacement of collars 18.

Another embodiment of the present invention is shown in FIGURE 3, in which hydraulic soil displacing means are disclosed in connection with piling which is driven into hydraulic soil such as that at the bottom of the sea. In addition to overcoming suction, the hydraulic soil displacing means used in connection with driven piling must remain in place relative to the piling during driving, and to this end, a pile 34 is provided with permanent eye bolts 36, 38, 40 and 42. Bolts 36 and 38 on one side of pile 34 are in vertical alignment with each other and with a permanent bolt 44 secured in the lower end of the pile, and bolts 40 and 42 on the other side of pile 34 are in vertical alignment with each other and with a permanent bolt 46 also secured in the lower end of pile 34. Four sets of frangible eyelets 48 are secured to pile 34 disposed lengthwise therealong, and four cables 50, 52, 54 and 56 are secured at their lower ends to bolts 44 and 46 and are trained each through its set of frangible eyelets 48 and finally through the upper eye bolts. The cables extend to the surface of the water and may be reeved over pulleys and operated by winches (not shown) or by tugs. Specifically, cable 50 is secured at its lower end to bolt 44 and trained in zigzag fashion through its set of eyelets 48 and extends through the eye of bolt 36. When cable 50 is drawn taut by a winch or tug, its associated eyelet shown at the left and rear side of pile 34 in FIGURE 3 will break and cable 50 will sweep approximately one-quarter of the interface between the hydraulic soil and that portion of pile 34 embedded therein until finally cable 50 extends substantially straight between bolts 36 and 44. Similarly, when cable 52 is drawn taut, the eyelets 48 which hold it out of straight line relationship between bolts 38 and 44 will be broken and cable 52 will sweep about a half of the pile-soil interface visible in FIGURE 3 comprising about a quarter of the total interface, until cable 52 extends straight between bolts 38 and 44. Similarly, when drawn taut, cables 54 and 56 will sweep the remaining quarters of the interface and will eventually assume a position extending straight between bolt 46 and bolts 40 and 42 respectively. It will be obvious that instead of eyelets 48, heavy staples may be used to retain the cables in zigzag relationship.

When all four cables have thus been straightened, the suction will have been broken to such an extent that pile 34 may be removed with very little more work than is required to overcome frictional forces and the weight of the pile. As in the embodiment of FIGURES 1 and 2, so also in the embodiment of FIGURE 3 the cables sweep the outer surface of pile 34 substantially parallel and contiguous to the pile-soil interface.

It will be understood that the embodiment of FIGURE 3 is also applicable to a barge as in FIGURE 1. In this case, only two zigzag cables are needed, and these will be disposed only on the undersides of chambers 16.

A further embodiment of the present invention is shown in FIGURES 4 and 5 for use with piling or other embedded support structures which are driven into hydraulic soil and therefore require suction-breaking means which will not be dislodged during driving. This latter embodiment is somewhat similar to that of FIGURES 1 and 2 in that it employs a sliding annular band but provides means for clamping the band to the bottom of the pile prior to driving and means for releasing the band for sliding movement to break suction prior to removal of the pile. Specifically, a pile 58 is provided with an encircling slidable collar 60 which may be drawn upwardly for hydraulic soil penetrating movement by a pair of cables 62 and 64 trained through permanent eyes 65 and 66, respectively, on pile 58. Cable 62 is trained through an eye 67 on one side of collar 60 and cable 64 is secured at its lower end to an eye 68 on the other side of collar 60. Collar 60 is in the form of a pair of semi-cylindrical collar halves 70 swingably mounted together by means of a hinge 72.

Means are provided for releasably securing halves 70 together in clamping relationship against pile 58 at its lower end, and for this purpose the lower end of cable 62 extends outwardly of pile 58 from eye 67 and is secured to an enlarged eye 74 at one end of an arcuate lock bar 76 which is supported and spaced outwardly from collar 60 by radially extending standards 78, 80, 82 and 84. Standard 78 is provided with a slot 86 which extends most of the length thereof and within which bar 76 is slidably retained. The width of slot 86 axially of pile 58, however, is not sufficient to permit enlarged eye 74 to pass therethrough, so that eye 74 and standard 78 provide coacting stops to limit sliding movement of bar 76 clockwise as seen in FIGURE 5. Standard 78 does not limit sliding movement of bar 76 counterclockwise through slot 86. Standard 80 is provided with a slot 88 therethrough which is of a radial extent only slightly greater than the radial thickness of bar 76 so that bar 76 may slide through slot 88 and rock on the marginal edges of slot 88 in a plane perpendicular to pile 58 for a purpose to be described but may not move a substantial distance radially relative to standard 80. Standard 82 is provided with a slot 90 affording substantial radial movement of bar 76 therein, and standard 84 is provided with a slot 92 affording still greater radial movement of bar 76 therein.

The right-hand end of bar 76 as seen in FIGURE 5 is provided with an enlargement 94 of a size such that it will not pass through slot 92. Thus, enlargement 94 does not limit clockwise movement of bar 76 relative to the half 70 on which standard 84 is mounted but does limit that relative movement in the opposite direction.

A frangible wire 96 is looped over bar 76 and secured at both ends to a half 70 between standards 82 and 84. A sear 98 is mounted on the radially inner side of bar 76 in a position such that when eye 74 is in contact with standard 78, sear 98 will be contiguous to the right side of standard 82 as seen in FIGURE 5. Also, in the position of bar 76 determined by wire 96, sear 98 will extend radially inwardly beyond the radially inner edge of slot 90.

Thus, with the parts as shown in full line in FIGURE 5, it will be clear that eye 74 and standard 78 will coact together and standard 82 and sear 98 will also coact together to retain the halves 70 in clamping position on pile 58 and that wire 96 will maintain the parts in this position. Upon a strong pull on cable 62, eye 74 will be drawn generally radially inwardly and bar 76 will tend to pivot about the fulcrum provided by standard 80. Wire 96 opposes this pivotal movement, but upon the imposition of sufficient tension in cable 62 wire 96 will break whereupon the parts will swing to the dotted line position as shown in FIGURE 5. The left-hand of bar 76 as seen in FIGURE 5 will swing radially inwardly through slot 86 and the right-hand portions of bar 76 will swing radially outwardly in slots 90 and 92. The radially inner end of sear 98 will thus clear the radially inner edge of slot 90, and upon continued tension in cable 62 bar 76 may be slid counterclockwise as seen in FIGURE 5 through slots 86, 88, 90 and 92 without interference between standard 82 and sear 98. This counterclockwise sliding movement continues until sear 98 strikes standard 80, at which point halves 70 are released from clamping engagement with pile 58. In view of the short radial extent of slot 88, sear 98 at not time passes through this slot, so that a continued movement of bar 76 opens the left-hand half 70 relative to the right-hand half 70 until enlargement 94 strikes the margins of slot 92. Enlargement 94 prevents disengagement of bar 76 from the right-hand half 70 as seen in FIGURE 5 inasmuch as enlargement 94 will not pass through slot 92.

In operation, tension will be applied simultaneously to cables 62 and 64, and when the tension in cable 62 has effected the foregoing release the cables will raise collar 60 evenly up along pile 58 at least to the dotted line position shown in FIGURE 4 with the same hydraulic soil displacing action as described in connection with FIGURES 1 and 2.

From a consideration of the foregoing, it will be obvious that all the initially recited objects of the present invention have been achieved.

Although the present invention has been described in connection with preferred embodiments, it is to be understood that modifications and variations may be resorted to without departing from the spirit and scope of the invention, as those skilled in this art will readily understand. Such modifications and variations are considered to be within the purview and scope of the present invention as defined by the appended claims.

What is claimed is:

1. A supporting member comprising a rigid member for use in contact with hydraulic soil, an elongated flexible member secured at one end to the rigid member, guide means secured to the rigid member and spaced from the secured end of the flexible member, the flexible member passing lengthwise slidably through the guide means closely adjacent the rigid member, and a plurality of spaced means fixedly secured to the rigid member and releasably securing the flexible member to the rigid member at a plurality of spaced points on the flexible member between said secured end and said guide means with a plurality of said points out of line with said secured end and said guide means and a plurality of said points out of line with each other and with the flexible member arranged in zig-zag configuration on the surface of the rigid member.

2. A supporting member comprising a rigid member for use in contact with hydraulic soil, an elongated flexible member secured at one end to the rigid member, guide means secured to the rigid member and spaced from the secured end of the flexible member, the flexible member passing lengthwise slidably through the guide means closely adjacent the rigid member, and at least one means fixedly secured to the rigid member and releasably securing the flexible member to the rigid member at at least one point on the flexible member between said secured end and said guide means with said at least one point out of line with said secured end and said guide means and with the flexible member arranged in zig-zag configuration on the surface of the rigid member.

References Cited in the file of this patent

UNITED STATES PATENTS

| | | |
|---|---|---|
| 1,045,764 | Williams | Nov. 26, 1912 |
| 1,347,688 | Estes | July 27, 1920 |
| 1,594,518 | Hathaway | Aug. 3, 1926 |
| 1,680,372 | Fenn | Aug. 14, 1928 |
| 1,681,533 | Gilliasso | Aug. 21, 1928 |
| 2,169,940 | Bonge | Aug. 15, 1939 |
| 2,858,105 | Lucas | Oct. 28, 1958 |